US007626988B2

(12) United States Patent
Dennison et al.

(10) Patent No.: US 7,626,988 B2
(45) Date of Patent: Dec. 1, 2009

(54) LATENCY-BASED SCHEDULING AND DROPPING

(75) Inventors: Larry R. Dennison, Walpole, MA (US); Derek Chiou, Rollingwood, TX (US)

(73) Assignee: FutureWei Technologies, Inc., Plano, TX (US)

( * ) Notice: Subject to any disclaimer, the term of this patent is extended or adjusted under 35 U.S.C. 154(b) by 593 days.

(21) Appl. No.: 11/148,952

(22) Filed: Jun. 9, 2005

(65) Prior Publication Data

US 2005/0281279 A1    Dec. 22, 2005

Related U.S. Application Data

(60) Provisional application No. 60/578,241, filed on Jun. 9, 2004, provisional application No. 60/578,452, filed on Jun. 9, 2004.

(51) Int. Cl.
*H04L 12/28* (2006.01)
(52) U.S. Cl. .................... 370/395.4; 370/412
(58) Field of Classification Search .................. None
See application file for complete search history.

(56) References Cited

U.S. PATENT DOCUMENTS

| | | | | |
|---|---|---|---|---|
| 6,247,061 | B1 * | 6/2001 | Douceur et al. | 709/240 |
| 6,810,426 | B2 * | 10/2004 | Mysore et al. | 709/234 |
| 6,952,739 | B2 * | 10/2005 | Fritz et al. | 709/232 |
| 7,095,754 | B2 * | 8/2006 | Benveniste | 370/465 |
| 7,113,510 | B2 * | 9/2006 | Lin | 370/394 |
| 7,272,144 | B2 * | 9/2007 | Cloonan et al. | 370/395.42 |
| 7,408,946 | B2 * | 8/2008 | Bitar et al. | 370/412 |
| 2003/0189943 | A1 * | 10/2003 | Gorti et al. | 370/412 |
| 2004/0105388 | A1 * | 6/2004 | Wilkins et al. | 370/235 |
| 2004/0125815 | A1 * | 7/2004 | Shimazu et al. | 370/411 |
| 2005/0058083 | A1 * | 3/2005 | Rogers | 370/252 |

OTHER PUBLICATIONS

"Quality of Service Configuration," *IPriori Software Configuration Guide*, vol. 3, Version 4.2, pp. 77-121.
Jacobson, V. and Karels, M. J., "Congestion Avoidance and Control," in *Proceedings of SIGCOMM '88* Stanford, CA, (Aug. 1988).
Floyd, S., and Jacobson, V., "Random Early Detection Gateways for Congestion Avoidance," *IEEE/ACM Transactions on Networking*, pp. 1-22 (Aug. 1993).
Hashem, E. S., "Analysis of Random Drop for Gateway Congestion Control," Master's Thesis, Massachusetts Institute of Technology (Aug. 1989).

* cited by examiner

*Primary Examiner*—Phirin Sam
(74) *Attorney, Agent, or Firm*—Hamilton, Brook, Smith & Reynolds, P.C.

(57) ABSTRACT

In scheduling a packet, latency requirements of the packet is determined. The packet is then scheduled according to its latency requirements. Queues may be assigned latency ranges and packets are assigned to the queues according to those ranges. Within ranges, queues of different priorities may be provided.

8 Claims, 5 Drawing Sheets

Figure 3A
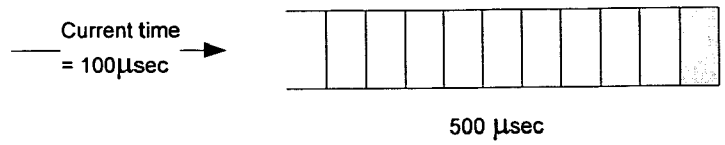
500 μsec
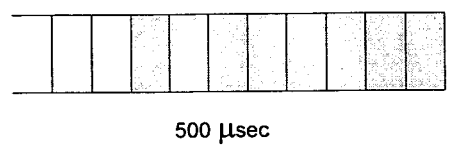
500 μsec
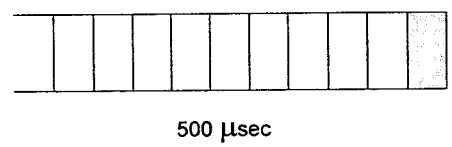
500 μsec
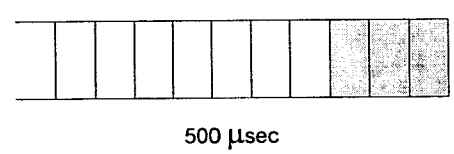
500 μsec
- - - - - - - - - - - - - - - - - - - - - - - - - - - - - - - - - - - - - - - -
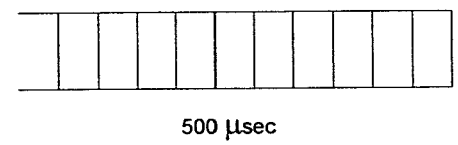
500 μsec
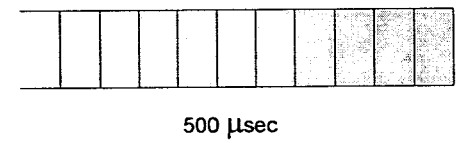
500 μsec
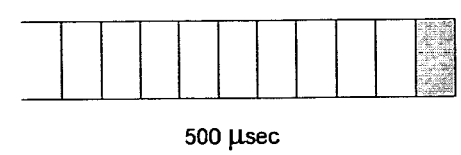
500 μsec
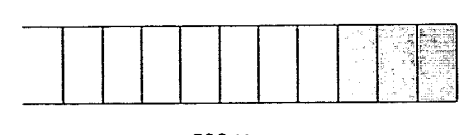
500 μsec
Figure 3B Figure 4A
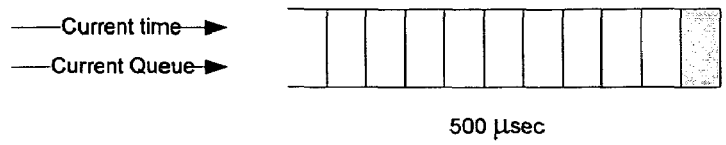
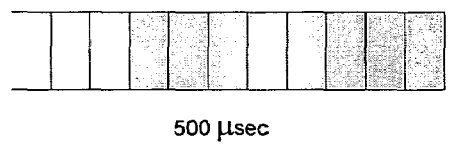
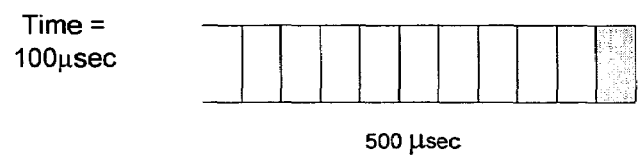
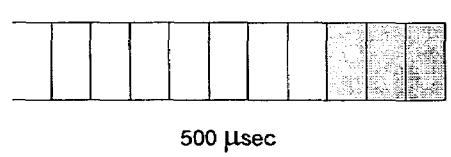
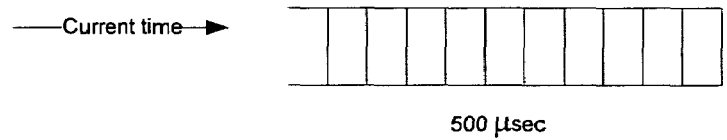
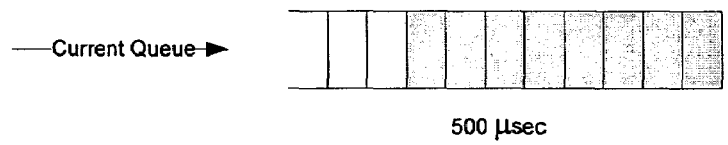
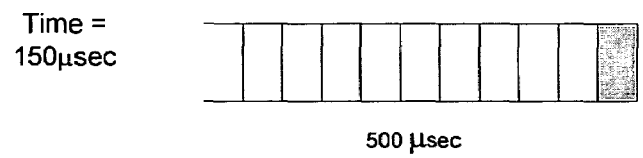
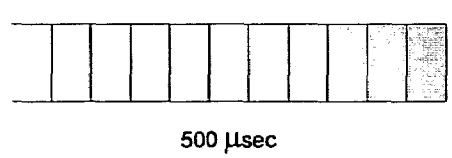
Figure 4B

LATENCY-BASED SCHEDULING AND DROPPING

RELATED APPLICATIONS

This application claims the benefit of U.S. Provisional Application Nos. 60/578,241, filed on Jun. 9, 2004 and 60/578,452, filed on Jun. 9, 2004. The entire teachings of the above applications are incorporated herein by reference.

BACKGROUND OF THE INVENTION

A generalized communication system transmits data from one or more input ports to one or more output ports. One unit of transmitted data is often called a datagram or a packet. A datagram/packet conceptually travels as one unit through the communication system, though the communication system may actually further segment that datagram/packet then reassemble the datagram/packet within itself before outputting it.

In a generalized communication system, it is possible that output ports are oversubscribed, that is, more data is intended for an output port than that output port can output at a given time. Over-subscription can be due to transient traffic patterns where data arrives at the same time but the port is not fundamentally oversubscribed, or persistent traffic patterns where the port is fundamentally oversubscribed.

If an output port is never oversubscribed, there is never the case when a decision needs to be made about what data to send next out the output port, since there will either be one data to send or no packet to send at any given time. If a system only sees such traffic patterns, and if traffic is always allowed to traverse an output port if there is bandwidth available, there is no need for output queuing structures.

Traffic patterns that do potentially oversubscribe output ports, however, are not uncommon. Communication systems, such as Internet routers, are one class of system that routinely experience transient and/or persistent oversubscription. Systems that do see oversubscription generally handle oversubscription using one or more of the following techniques: (i) buffering, that is to provide memory to store the extra packets until they can be transmitted (ii) back-pressure, that is to disallow additional traffic to enter the oversubscribed component until there is additional available buffering/bandwidth and (iii) dropping, that is to discard the packet and thus not transmit it. Buffering generally appears to be one or more in-order queues. Buffering provides elasticity to smooth out transient oversubscription, but does not solve persistent oversubscription. Since buffers are limited in size, persistent oversubscription will result in either back-pressure or dropping. Persistent backpressure will generally result in cascaded backpressure, buffering further upstream, generally at the input ports, or dropping.

When an output port is oversubscribed, some data must wait while other data is forwarded. A scheduling algorithm specifies which of the available packets will be sent, while a buffering scheme specifies how packets are buffered and/or discarded as they arrive. Generally a scheduling algorithm and the buffering scheme are related and depend on each other.

Packets traversing Internet routers can generally be dropped if necessary. In some communication systems, such as high-performance parallel computers, dropping packets is unacceptable and results in an error condition. Thus, the specific communication system and the application space in which it is used restricts the type of scheduling and buffering policies that are used.

Handling oversubscription in a fair fashion is non-trivial. Ideally, the output port can accept the maximum oversubscription to allow the output port to see all of the traffic that wants to exit via the output port. In that case, the scheduling algorithm implemented at the output port can make the most intelligent decisions. Backpressure in general does not allow some of the traffic to reach the output port when it should, making the scheduling algorithm operate with incomplete information and potentially forcing drops further upstream where there is less information about the packets trying to traverse the output port. Thus, backpressure can introduce imprecision into the system. Being able to selectively backpressure certain classes of service and not backpressure other classes of service is one possible solution to this problem.

There are many scheduling algorithms for deciding what packets to forward and what packets to delay. A simple scheduling algorithm is first-come-first-serve. Data that arrives first is forwarded first. In such a scheme, only a single queue per output port is required to provide buffering in the case of transient oversubscription. If the queue fills up and there is no space in the queue when a packet arrives, the packet must be dropped or backpressure asserted.

Another scheduling algorithm is strict priority. In this algorithm, queues are assigned a strict priority relative to the other queues. If packets are available in queue A and queue B, where queue A is higher priority than queue B, packets will be taken only from queue A until either packets are available on queue C with higher priority than queue A or queue A has no more packets. In the former case, packets will be drawn from queue C while in the latter case, packets will be drawn from queue B. Strict priority schemes often allow for multiple queues to share the same priority. In those cases, some additional scheduling algorithm is required to arbitrate between the multiple queues in the same priority.

A more complex scheduling algorithm found in Internet routers is weighted-fair-queuing (WFQ), where there are several queues and a weight that specifies a certain fraction of the total bandwidth is assigned to each queue. Packets are assigned to a specific queue based on some characteristic such as the priority of that packet, the input port it arrived on, and so on. When there is no oversubscription, any queue can use as much bandwidth as it needs. When there is oversubscription, however, every queue is allowed to consume its assigned fraction of bandwidth before any excess is divided proportionally between the queues that have additional bandwidth needs beyond their allocated fraction of bandwidth.

Different scheduling algorithms can be combined. For example, the DiffServ specification combines two strict priority queues with a six queue WFQ group. Packets in the top priority queue are always transmitted before data in the second priority queue. Packets in the second priority queue are always transmitted before data in the six WFQ group queues. Packets in the six WFQ group queues are sent according to the WFQ weights assigned to each of the queues.

Using DiffServ, or something like it, Internet routers provide different levels of service for different types of packets. For example, voice packets generally require low latency and are thus categorized as high-priority packets. On the other hand, best effort packets have less stringent latency requirements and are thus prioritized behind voice packets.

The scheduling algorithms commonly used today make their decisions based on queues that encode priority and/or class. A priority or class could have a strict priority relative to the other queues, a guaranteed proportion of the total bandwidth, a fixed amount of guaranteed bandwidth and so on.

Weighted Random Early Discard (WRED) is a well known buffering method that allows different classes of packets with different throughput and latency requirements to share the same queue. For each class of packet, WRED provides three parameters, minThreshold, maxThreshold and a slope. When the queue size is less than the minThreshold, packets of that class are enqueued. When the queue size is greater than minThreshold, packets are dropped at a probability defined by a line starting at the minThreshold with the specified slope. Thus, as the queue size grows, the probability of a packet being dropped increases. If the queue size is maxThreshold or deeper, all packets of that class are dropped.

Clearly, higher priority packets will have some combination of higher minThresholds and maxThresholds and lower slopes than lower priority packets. WRED with appropriate set parameters ensures that higher priority packets are treated relatively better than lower priority packets. What it does not ensure, however, is absolute performance. Generally, a WRED-protected queue is one of many queues. Activity in the other queues can affect the drain rate of a queue. Thus, given a specific set of WRED parameters, packet latency can vary widely, up to the dynamic range of the queue's drain rate which could potentially be multiple orders of magnitude. Such range of latency can make equipment that only use WRED for queue admission unacceptable for latency-sensitive traffic such as voice or gaming.

SUMMARY OF THE INVENTION

Traditional scheduling algorithms use a queue per packet priority and/or packet class. Packet latency requirements can only be approximately implemented by such scheduling algorithms. For example, imagine two types of high priority packets. The first type must pass through the router in 150 microseconds or less and the second type must pass through the router in 300 microseconds or less. Both requirements are difficult for many routers. Most routers support a DiffServ queuing/scheduling system. In the DiffServ model, one might assign the first type of packet to the top strict priority queue and the second type of packet to the second strict priority queue. If traffic is very well behaved, where packets do not arrive in a bursty fashion, and the output is not oversubscribed, the DiffServ model generally ensures that the packets meet their requirements. However, the top priority packets oftentimes have highest priority throughout the system and will tend to arrive at the output at close to the minimum latency through the router. Since the second priority packets tend to get lower priority access to the communication system resources, they may spend much more than the minimum amount of time in the router and thus get close to their overall maximum latency. Thus, it is quite possible that a lower priority packet should actually be scheduled to traverse the output port before a higher priority packet that arrives at the same output at the same time. DiffServ is not capable of doing that; it will schedule the higher priority packet first, even though that higher priority packet can wait much longer before becoming useless than the lower priority packet. This problem is possible even if an output port is not persistently oversubscribed.

Rather than scheduling based solely on priority queues, scheduling decisions may be based on a packet's priority, age, and its latency requirements. Conceptually, packets are time stamped at a consistent point, such as when they arrive at the ingress or at another convenient consistent point to ensure that packets have comparable time stamps. Explicit timestamps may not be necessary if the latency up to the queue point can be determined some other way, such as a stall counter associated with each packet that increments when a packet stalls, or if latency is somehow guaranteed. At the egress, packets are scheduled for forwarding based on the amount of time that packet has left to be useful along with the overall priority of that packet. This scheme ensures that there is a possibility of scheduling packets to meet their latency requirements.

Implementing such a scheme is, at first glance, not trivial. Whenever the next packet can be forwarded, all of the packets must be examined to determine which one needs to be forwarded first. This approach is extremely difficult to implement given any reasonable amount of buffering.

An important observation that can simplify implementation is the fact that the latency requirements of a packet do not change over time. In addition, the latency requirements of a particular flow also do not change over time, or change extremely slowly (generally, when a flow is reconfigured).

One embodiment of this invention is an insertion sort, where each new packet arriving at the egress is inserted into a queue ordered by the latest time when a packet can be forwarded and still meet its latency requirement. The queue is always serviced at the egress port forwarding rate and thus, assuming there is a valid schedule that satisfies all of the packet latency requirements, this scheme will find it.

An insertion sort, however, is difficult to implement in hardware, since it requires at least O(log(QueueDepth)) comparisons to determine where to insert and complex insertion circuitry. The preferred embodiment of this invention uses a set of queues, where each subsequent queue represents a fixed amount of latency in the future from the previous queue. Each fixed latency queue can contain a maximum number of bytes to transmit. As a packet arrives at the egress, its last possible scheduling time is determined, the appropriate queue that meets that time is determined and the packet is enqueued into that queue. As long as the egress port is not oversubscribed and a valid schedule exists, this scheme will ensure packets meet their schedule with an error margin equal to one queue time quantum.

Support for handling oversubscription is necessary for systems that may encounter oversubscription. Oversubscription may be handled in a variety of ways. For example, the limited depth queues provide an easy criteria to drop packets. If the queue for which a packet is destined is full when the packet arrives, that packet is dropped.

Thus, the present invention relates to a method of scheduling packets. In that method, latency requirements of a packet are determined and the packet is scheduled according to its latency requirements. To that end, the packet may be assigned to a queue corresponding to its latency requirements.

The packet may be assigned to a queue having latency furthest in future time that does not violate the latency requirements of the packet. Each queue maybe assigned a time quantum. A current queue may be advanced when the current time exceeds its maximum time. The remaining packets in the queue may be dropped when the current time exceeds the maximum of that queue. A packet may be dropped as it arrives if the corresponding queue is full.

Packets may be enqueued in queues according to priority or class of service. Different queues in a time quantum may correspond to different priorities or classes of service. Packets may be enqueued according to the WRED protocol.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and B illustrate a protocol in which time is advanced early.

FIGS. 4A and B illustrate a protocol which separates early queue advance and current time advance.

DETAILED DESCRIPTION

A description of preferred embodiments of the invention follows.

Traditional QoS schedulers use multiple queues, where each queue represents a priority or a flow. This invention breaks from that methodology by using separate queues to represent time quanta rather than a priority or a flow. In one embodiment, the queues are scheduled in a strictly round-robin fashion, where one queue is completely drained of packets before the system moves to the next queue. By using such scheduling and by enqueuing no more than a maximum number of bits/bytes in each queue, one can guarantee a maximum time in the future when all packets enqueued in a queue have left the system. Note that though this invention is described in the context of an output port of a switch fabric, it is applicable to any system that has contention for a resource, especially when there are latency requirements.

Thus, by enqueuing a packet into a specific queue, one ensures that it will exit the system no later than that queue's maximum service time. As a packet arrives to be enqueued, its size, maximum latency and current latency is determined. That information is used to select the queue that represents the time furthest in the future that does not violate the packet's maximum latency. The packet is enqueued into that queue. By always enqueuing into the maximally time-distant queue, we ensure that order is maintained between packets in the same flow, that presumably have the same maximum latency constraints. Thus, as long as the specific dequeue policy drains one time quantum before advancing to the next and packets are always enqueued in the queue representing their maximum latency, packets from the same flow will remain in order.

Queues are reused once they have been drained. There must be a sufficient number of queues to represent the maximum latency and the required resolution of that maximum latency.

Figure 1:
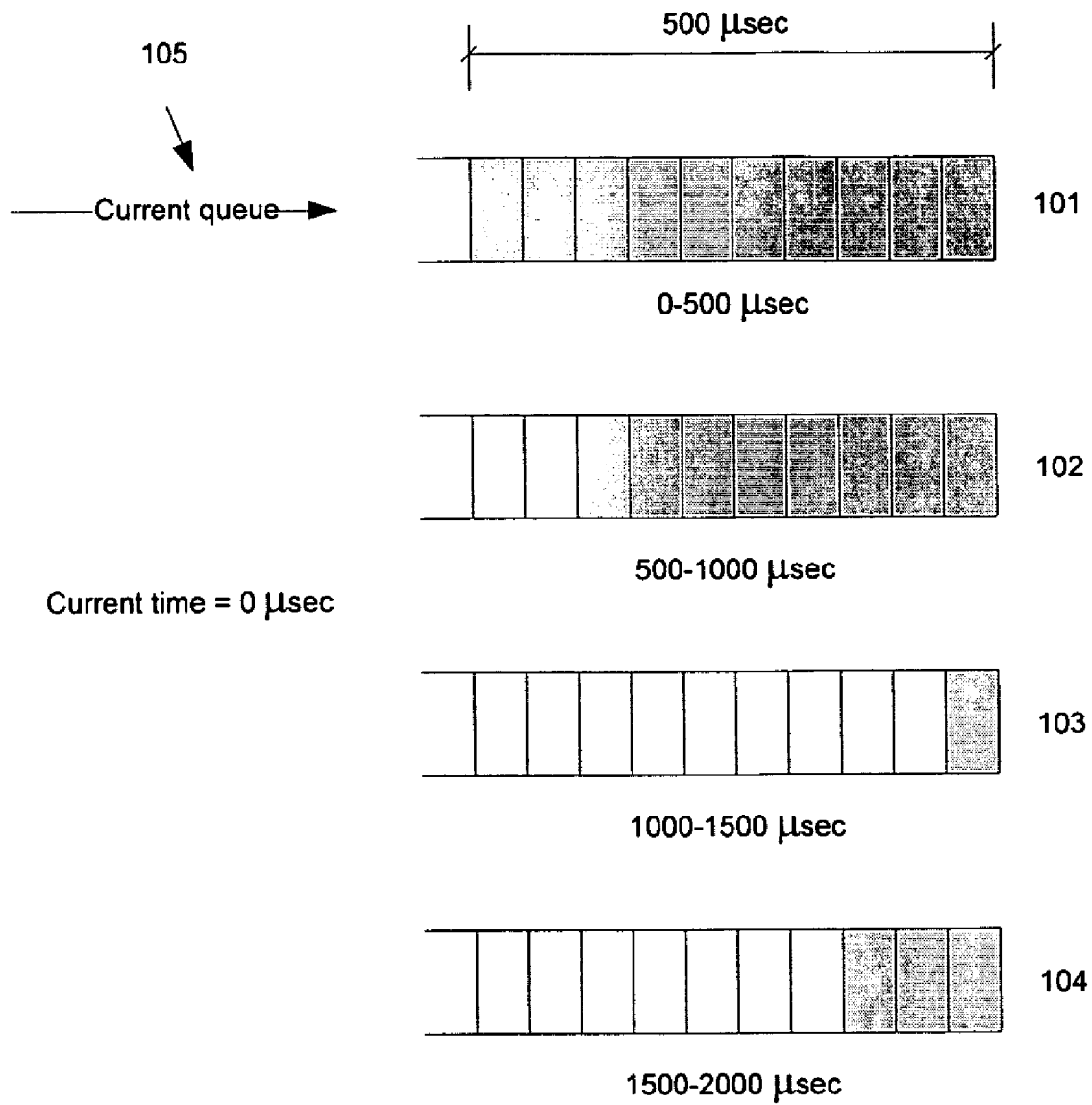
FIG. 1 is a basic single priority system embodying the present invention.

For example, see FIG. 1. In this example, there are four queues labeled 101, 102, 103 and 104. In this example, all queues can contain up to 500 μsec of packets. For example, if one 40 Byte packet can be transmitted every μsec, the queue depth is 500 40 Byte packets. Each queue represents a unique time range. In this example, Queue 101 is the current time to 500 μsec and is just starting to be drained. Queue 102 represents 500 μsec to 1000 μsec in the future, Queue 103 represents 1000 μsec to 1500 μsec in the future and Queue 104 represents 1500 μsec to 2000 μsec in the future.

When a packet arrives, the correct queue is determined from the current time, the number of bytes in the packet, the amount of time the packet has already been within the system and the maximum latency tolerable by the packet. For example, assume a 40B packet arrives that has already been in the system for 200 μsec and can tolerate 1500 μsec latency. If the packet itself takes 100 μsec to transmit due to its length, the packet must be enqueued in a queue that will be serviced before 1500 μsec−200 μsec−1000 μsec=1100 μsec elapses. Given the initial conditions shown in FIG. 1 where the current time is 0, the packet needs to be transmitted before time 1100 μsec. In that case, when the current time is 0, the packet would be enqueued in Queue 102 that represents time 500 μsec to 1000 μsec. That queue will be serviced by time 1000 μsec, ensuring that the packet is transmitted before its maximum latency. If the current time was 450 μsec, then the packet would need to be transmitted before time 1550 μsec. In that case, the packet would be enqueued in Queue 103, which represents time 1000 μsec to 1500 μsec. That queue will be serviced by time 1500 μsec, ensuring that the packet is transmitted before its maximum latency.

Thus, a key different between the invention and standard queuing schemes is making the queue represent a time range, rather than a priority or a class of service. By servicing out of only out of the queue (or a set of queues as described later) representing the current time quantum and going to the next time quantum only after the current time quantum queue(s) have been completely processed, this invention can ensure packets can be scheduled to match their latency requirements. After a queue is completely processed, it is assigned to be the queue for the next unallocated time quantum.

Figure 2:
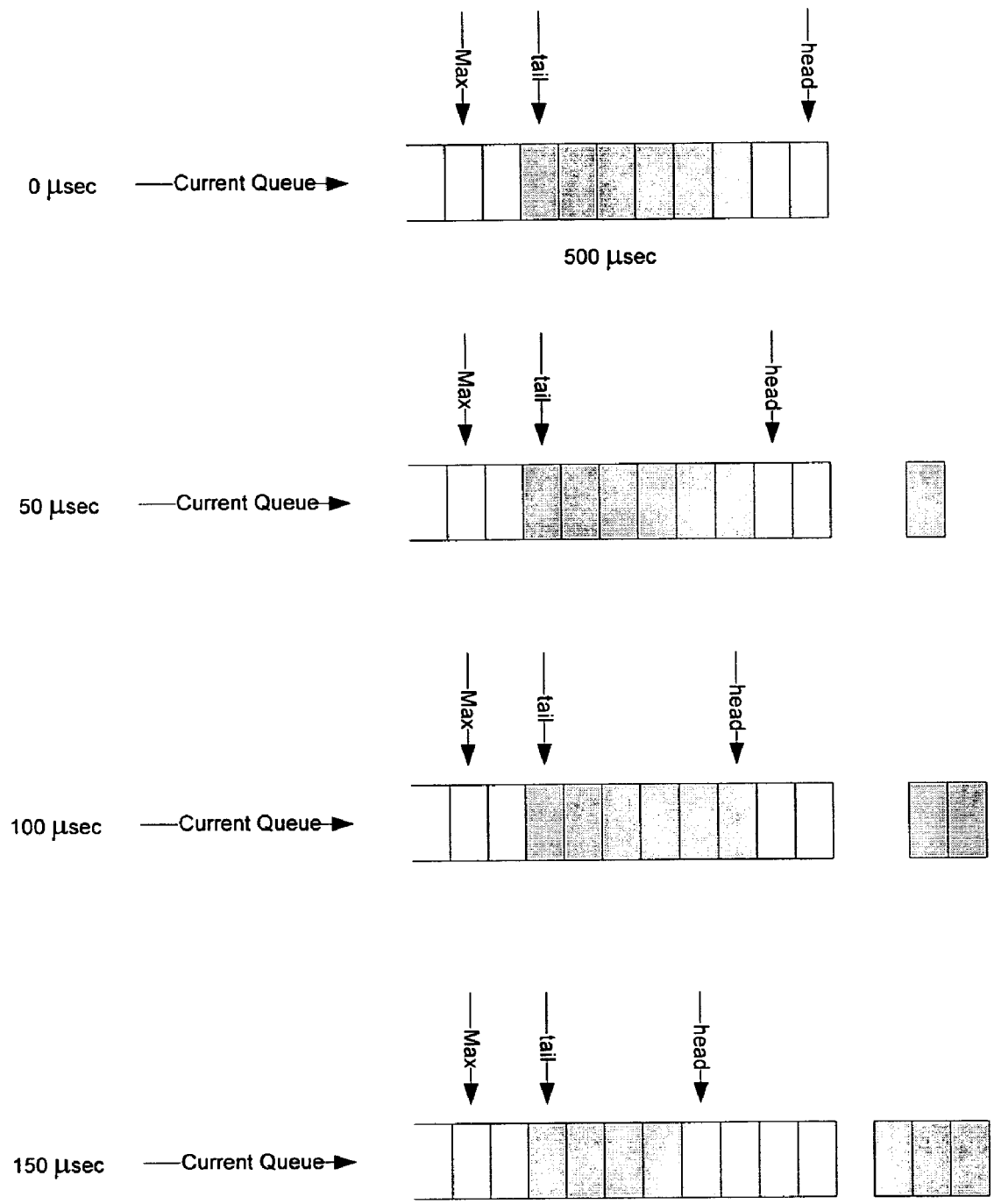
FIG. 2 illustrates decreasing queue depth over time.

As time progresses, the logical depth of the currently serviced queue is reduced. FIG. 2 gives an example of how the maximum logical depth of a queue changes over time. At the beginning of time, there are 400 μsec of packets enqueued and the queue has 500 μsec of buffering capacity. After 50 μsec, the first queue depth can be no deeper than 450 μsec of packets. After another 50 μsec, the queue depth can be no deeper than 400 μsec and so on. Packets are transmitted at the output rate, ensuring that the queue depth does decrease.

There are different ways to handle a packet that has arrived after it has already exceeded its maximum latency. One possibility is to simply drop the packet. Another policy is to enqueue the packet in the next time quantum queue that has space and hope that the packet is still useful to the destination when it arrives. Note that if packet ordering is important, the packet must be enqueued to the end of the queue.

There must be some way to deal with oversubscription if necessary. If a queue fills up, any additional packet to the same queue is obviously oversubscription since there are more packets trying to traverse the output port than available bandwidth. One policy to handle a full queue is to drop the packet that just arrived for that queue. Another potential policy is to provide more buffering in the queue for "standby" packets and dropping standby packets if they cannot be processed in time. Standby packets might be processed if an earlier queue is emptied as discussed below.

A variation is to allow enqueuing into an earlier queue if space is available. Such a policy can make better use of queue space, but will not be able to schedule as well, since some earlier queues may fill up before they should and cause packets to drop even though there is a valid schedule for the complete set of packets. Also, if some packets from a flow are queued in an earlier queue and earlier packets from the same flow are queued in a later queue, those packets will be out-of-order, an unacceptable condition for some systems where this invention can be used.

How packets are dequeued from the queues affects the behavior of the system. One dequeuing policy is to dequeue from the current-time queue. If the current-time queue is empty, nothing is dequeued until the current time quantum expires at which point the system moves to the next queue. This policy does potentially leave opportunities where there are available packets to be forwarded, but are not because dequeuing from a future-time queue is not allowed. However, this policy also minimizes jitter, a potentially useful characteristic.

Rather than stay with a time quantum until it expires, even though it means not sending packets from a future time quantum and thus wasting output bandwidth, another dequeue policy would allow the current time to be advanced to the next time quantum if the current time queue is out of packets. When a new packet arrives, the system uses the current time as usual to decide which queue that new packet will go to.

FIGS. 3A and B present an example of advancing time early. There are 10 slots per queue, each queue is 500 μsec, and thus each slot is 50 μsec of time. At time 100 μsec one packet remains in the first queue that represents times 0 μsec to 499 μsec in FIG. 3A. Thus, that packet will be transmitted by time 150 μsec, and the queue will be empty. At that time, the system can advance time in the system to 500 μsec and thus advance the current queue being processed to the next queue as in FIG. 3B.

Though this algorithm does maintain correct packet order per flow since packets continue to be enqueued into the queue that represents their maximum latency, there is an issue as well. The extra available time left in the queues that are early advanced is lost. In the example in FIG. 3, at time 150 μsec, when the current time is advanced, all of the available slots in the first queue are lost. Thus, if a packet comes in the door at time 150 μsec that only has 50 μsec to its maximum latency (thus needing to be sent out by time 200 μsec), it will appear to have already violated its maximum latency due to the premature advance of time. That packet could be sent and meet its latency requirement. That fact, however, is masked by the early advance of time.

Rather than advancing time early, the scheduler can simply advance the current queue being processed early, while advancing the current time tracked by the system consistently with real time. FIGS. 4A and B show an example which is the same example as the example in FIGS. 3A and B, but advancing the queue pointer separately than the current time. Doing so ensures that the current time queue which is empty can still be enqueued to, thus allowing packets that arrive after the current queue pointer is advanced due to lack of packets to transmit from that time quantum to get enqueued into the earlier queue and thus go ahead of the currently processed queue. In that case, a simple implementation has the current queue pointer go back to the formerly empty earlier queue that is currently enqueuing a packet.

A queue could contain exactly the amount of buffering necessary for the queue's time quantum or could contain more buffering than is necessary for the queue's time quantum.

Figure 5:
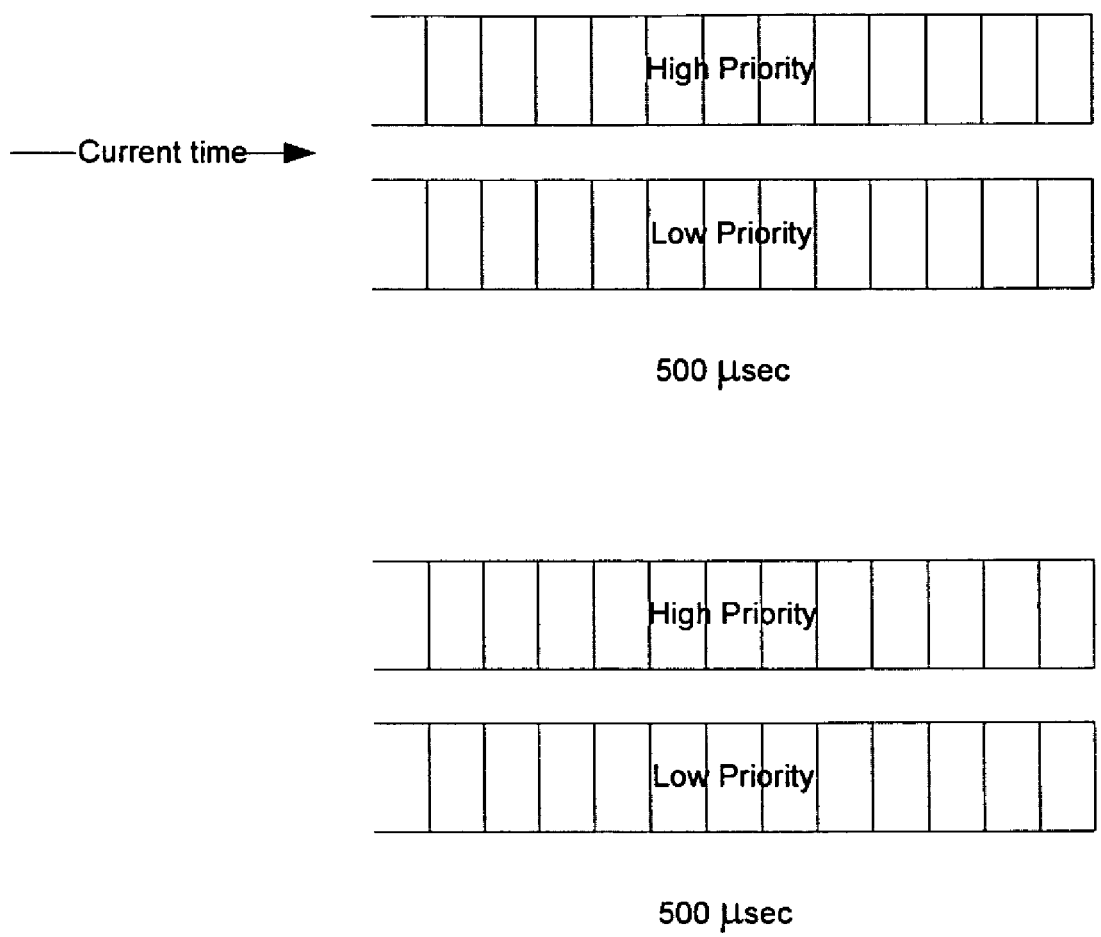
FIG. 5 illustrates high and low priority queues at each time range.

Up to this point, we have had a single queue per time quantum. An issue with this scheme is that a specific queue into which a high priority packet needs to be enqueued may be full of lower priority packets. One way to solve that problem is to have separate queues per priority per time period as illustrated in FIG. 5. Packets are enqueued into the appropriate priority queue within the correct time period. Each priority queue per time period has its own allowed depth of bits/bytes which should allow for the maximum number of bytes that priority is allowed to send in a specific time quantum. If a queue is full, indicating an oversubscription case in a particular priority, the packet is discarded. Note that there may be oversubscription across the priorities, but not within a single priority. In that case, packets will not be discarded during the enqueue, but will be discarded once time is advanced as specified by the time quantum.

This technique ensures that there is always sufficient space for high priority packets within each time quantum. The dequeue policy is modified to take packets from each time quantum, high priority queues first. If there is a balance between priorities to ensure that high-priority packets cannot starve low-priority packets, a weighted fair queuing scheme can be used to select between the different priority queues.

The same scheduling concerns that applied to one queue per time quantum apply to multiple queues per priority. Rather than stay with a time quantum until it expires, even though it means not sending packets from a future time quantum and thus wasting output bandwidth, another dequeue policy would allow time to be incremented if the current time is out of packets. Depending on relative priorities, time may be incremented if there are high priority packets in a future time quantum and none in the current time quantum, even if there are lower priority packets in the current time quantum. In that case, the lower priority packets may be dropped since they may have violated their maximum latency or they can be attached to the head of the lower priority queue in the next time quantum that will be used based on the availability of the higher priority packets. Such a scheme and its derivatives can take advantage of standby packets, since if one queue cannot consume all of its bandwidth, a later queue may be able to use the extra bandwidth and still allow all of the enqueued packets to meet their latency requirements.

Yet another dequeue policy keeps separate current times for each priority, rather than a single current time across all priorities. Doing so allows the current time pointer to move independently for each priority and thus eliminates the need to move packets between queues and so on. A separate algorithm runs to decide which priority gets serviced at any given time and the current time pointer for that priority is used and advanced appropriately, independent of the other priorities. If a specific priority is selected at a given time and it is discovered that the current time for that priority has already passed, the packets associated with that priority and current time are thrown away and the current time is advanced. If minimizing jitter is important for a specific priority, that priority's time quantum is advanced at the quantum intervals. If minimizing jitter is not important for a specific priority, that priority's time quantum is advanced as soon as that priority's current-time queue is empty.

This dequeue scheme allows latency to be minimized for each priority, given a certain priority selection algorithm. For example, if there are two priorities in the system and high priority packets have absolute (strict) priority over low priority packets, this dequeue policy will ensure that anytime there is a high priority packet, it will be serviced before low priority packets, even though the low priority packets may be aging beyond their useful point in time and thus can be discarded.

As was true in previous examples, additional buffering, over what can be transmitted in a time quantum, can be provided per queue as well to deal with transient bursts. For example, in the case that a particular time queue goes empty and either time is advanced early or the current queue is advanced early, it may be advantageous to have more packets in a queue than can actually be sent in that time quantum, since there is effectively additional time being added to that queue from the previous queue finishing early.

Note that having additional buffering does require additional buffering resources but, if buffering space is dynamically allocated per queue, will not be overly wasteful. Dynamically allocating space per queue is performed by allocating buffer space per packet or per block of packets and using a linked list of such dynamically allocated blocks as the implementation of the queue. Head and tail pointers are kept per queue to point to the first buffer and last buffer respectively.

If high priority packets must evenly split the bandwidth with low priority packets upon oversubscription, but can consume up to 100% of the bandwidth when there is not oversubscription, each of the queues is configured (possibly individually configured to ensure that each queue has the desired behavior) to hold as many bytes as can be transmitted in each time quantum. The priority arbiter alternates between the high and low priority queues. If a priority's current time is advanced only after that priority's current-time queue goes empty, latency is minimized for that priority, since packets in that priority will be transmitted as soon as possible, rather than wait until they are at their maximum latency.

If jitter is important and high priority packets are only allowed to consume 20% of the available bandwidth, each high priority queue depth can be limited to be 20% of the bytes that can be transmitted in that time quantum and the high priority time quantum is only advanced at time quantum intervals. Doing so ensures that high priority packets are guaranteed to take no more than 20% of the available bandwidth and that jitter is minimized.

Since some low priority packets are not latency sensitive at all, one can have a single queue for such packets, in which case time is never advanced. Proportional scheduling can be performed on such a queue as well.

One could also have some queues within a time quantum advance as quickly as possible and others advance only when the time quantum expires. Doing so allows for minimizing latency for some packets and minimizing jitter for other packets in the same system.

Rather than have separate queues per priority per time quantum, another solution reserves a certain amount of space for each priority in each queue. Doing so keeps the number of queues equal to the number of time quanta, but requires a dropping algorithm such as WRED that will drop certain packets before the queue fills. Another possibility is to allow packets already enqueued to be killed when higher priority packets that need the queue space arrive. These techniques can be combined with the latency-based queues to provide finer control than afforded by any of the techniques in isolation.

Time quanta do not have to be constant though it tends to be convenient to have all time quantum be the same size.

This scheme could be adapted across multiple nodes within the global network. For example, one could time stamp packets when they enter the Internet and use that Internet-wide time stamp to alter either the latency requirement or the router-specific time stamp to speed up packets after they travel through routers that did not meet their local latency requirements. Using a global maximum latency that spans across multiple routers allows a particular router optimize latency across an entire system, rather than just through itself. For example, a router could tell if a packet traversed upstream routers faster than expected, thus giving it more time to route the packet. Since latency requirements are really end-to-end and not specific to a given router, such a scheme could dramatically improve the overall performance of the Internet for latency sensitive packets.

Time stamps can be added to a packet in a variety of ways. One way is for the packet to be encapsulated into a new packet with a fixed sized timestamp as the first data field and the entire packet as the second data field. A new header would be placed at the front of the newly formed packet that would have the same routing fields as before, but with some sort of tag indicating the packet was encapsulated with a timestamp and the packet size increased to be consistent with the new timestamp that was introduced and any additional information that is in the header.

One might also consider how to modify extant queuing/scheduling algorithms to allow them to provide some latency guarantees. If classes with longer maximum latencies have higher priority, then using the maximum latency for each class of packet to decide whether to drop or not is reasonable. In most cases, however, the lower the maximum latency, the higher the priority. Thus, the maximum latency for each class of packet cannot, in general, be used as the only drop criteria, i.e., drop if the queue depth is greater than the maximum latency, since that would allow packets with higher maximum latencies to be enqueued while packets with lower maximum latencies are dropped. Instead, the drop parameters for each class of a given queue must still incorporate information from the other classes destined for the same queue. For example, if there are two classes, one a high priority, low maximum latency class and the other a low priority, high maximum latency class, the low priority class must have a lower drop threshold than the higher priority class, even though it can tolerate more latency, since it cannot be allowed to delay the higher priority class. Such a system will work, but will not effectively provide both long latency tolerance and low latency tolerance in the same system.

Another strategy is to provide a method to approximate the latency that a newly arrive packet might see before it is output. Different methods have different levels of accuracy. The traditional method used, the depth of the queue, is inaccurate when there are multiple queues in the system. One way to more accurately determine the latency of a queue at a given time is to keep track of the total number of bytes queued in all queues and divide by the drain rate of the output port. Since everything that is already queued is very likely to be forwarded, it is conservative to assume that everything queued before the current packet will be forwarded before the current packet.

Though such a scheme to predict latency works, it can be too conservative. A high priority queue may be given much more bandwidth than a low priority queue and thus may not be affected by other queues. A much more accurate estimate of the drain rate can be calculated with not much additional work. The scheme requires knowing the weight of the queue in question and the total weight of the all of the queues that have enqueued packets. The total weight is maintained simply by a single accumulator that gets incremented by the weight of a queue that has just gone from empty to having a queued packet and decremented by the weight of a queue that has just gone empty. Using the weight of the current queue and dividing it by the total weight of non-empty queues will give an accurate fraction of output bandwidth that the current queue can use. The current queue depth can then be used to compute the expected latency.

Both of these latency calculations are not completely accurate since queue latency depends on future packet arrivals to other queues that are unpredictable. They should, however, be accurate enough to give reasonably accurate latency bounds on packets. Thus, one could implement approximate latency guarantees using a more standard queuing scheme by predicting the latency a packet may encounter using the alternate techniques described.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of scheduling packets in a communication system, the method comprising:
   determining latency requirements of a packet using a router; and
   assigning the packet, based on its latency requirements, to one of plural queues having different assigned time ranges using the router.

2. A method as claimed in claim 1 wherein the packet is assigned by the router to a queue having latency furthest in future time that does not violate the latency requirements of the packet.

3. A method as claimed in claim 1 wherein a packet is dropped by the router if the corresponding queue is full.

4. A method as claimed in claim 1 wherein the remaining packets in a queue are dropped by the router when a current time exceeds a maximum time of the assigned time range of the queue.

5. A method as claimed in claim 1 wherein different queues correspond to different priorities or classes of service.

6. A method as claimed in claim 1 wherein packets are enqueued by the router in queues according to a priority or class of service.

7. A method as claimed in claim 6 wherein packets are enqueued by the router according to a WRED protocol.

8. A method as claimed in claim 1 further comprising:
   determining the priority of a packet using the router and assigning the packet to one of plural queues having a given time range using the router, the queues having the given time range also having different assigned priorities or classes of service.

* * * * *

UNITED STATES PATENT AND TRADEMARK OFFICE
CERTIFICATE OF CORRECTION

| | | |
|---|---|---|
| PATENT NO. | : 7,626,988 B2 | Page 1 of 1 |
| APPLICATION NO. | : 11/148952 | |
| DATED | : December 1, 2009 | |
| INVENTOR(S) | : Dennison et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Second Day of November, 2010

David J. Kappos
*Director of the United States Patent and Trademark Office*